United States Patent [19]

van der Leeuw

[11] 4,074,163

[45] Feb. 14, 1978

[54] DISCHARGE LAMP WITH HEAT SHIELD

[75] Inventor: Bart van der Leeuw, Eindhoven, Netherlands

[73] Assignee: U.S. Philips Corporation, New York, N.Y.

[21] Appl. No.: 653,432

[22] Filed: Jan. 29, 1976

[30] Foreign Application Priority Data

Mar. 19, 1975 Netherlands ........................ 7503243

[51] Int. Cl.[2] ............................................ H01S 61/52

[52] U.S. Cl. ........................................ 313/13; 313/27; 313/44; 313/47

[58] Field of Search ........................ 313/33, 44, 47, 20, 313/13, 27, 201

[56] References Cited

U.S. PATENT DOCUMENTS 3,872,340 3/1975 Collins ............................ 313/201 X

*Primary Examiner*—Rudolph V. Rolinec
*Assistant Examiner*—Darwin R. Hostetter
*Attorney, Agent, or Firm*—Frank R. Trifari; Robert S. Smith

[57] ABSTRACT

The invention relates to a gas-and/or vapor discharge lamp which is provided with a discharge tube and with a heat shield.

The heat shield is connected to a bimetal element of the lamp such that, when the temperature of the discharge tube is raised (or lowered) the heat shield is further removed from (or moved towards) the discharge tube. Accordingly the lamp reaches its operating condition rapidly after starting and in the operating condition fluctuations in the temperature are very small.

3 Claims, 7 Drawing Figures

DISCHARGE LAMP WITH HEAT SHIELD

The invention relates to a gas- and/or vapour discharge lamp provided with a discharge tube and with an element which exclusively functions as a heat shield, which element is situated, in the non-started cold state of the lamp, near an external part of the discharge tube.

A known discharge lamp of said type is, for example, described in Dutch Patent Application No. 7,106,348.

A drawback of this known lamp is that after manufacture the heat shield cannot be displaced any more, so that the heat insulation of the discharge tube cannot be increased any more.

The object of the invention is to enable a suitable variation of the heat insulation of the discharge tube by means of a heat shield in a discharge tube of the aforementioned type. Such a variation in heat insulation is sometimes desired because a higher heat insulation is as a rule desired in the cold state than in the hot state of the lamp.

A gas- and/or vapour discharge lamp according to the invention provided with a discharge tube and with an element which exclusively functions as a heat shield, which element is situated, in the non-started cold state of the lamp, near an external part of the discharge tube, is characterized in that the heat shield is movable and mechanically coupled to a bimetal element of the lamp in such a way that when the temperature of the bimetal element varies, the position of the heat shield with respect to the discharge tube changes.

An advantage of a lamp according to the invention is that by varying the position of the heat shield the heat insulation of part of the discharge tube can also be varied.

It might be conceivable that a bimetal element is controlled through a separate heat source, for example an incandescent lamp filament of the lamp. In that case it might, for example, be possible to dim the light radiation of the discharge tube to a certain degree by means of the bimetal element.

In a preferred embodiment of a gas- and/or vapour discharge lamp according to the invention the bimetal element is arranged in such a way that, when its temperature is increased the heat shield occupies a position in which the heat insulation of the discharge tube is smaller.

An advantage of this preferred embodiment is that it is now possible to exercise a regulating influence on the temperature of parts of the discharge tube by thermal contact with the discharge tube. If the discharge tube gets slightly too cold — for example due to a decrease in the supply voltage — the heat insulation of the discharge tube will be increased by the action of the bimetal element and thus by the action of the heat shield. As a result the action of cooling the discharge tube will be opposed. When the lamp is in the operating mode the discharge tube will then be kept in operating conditions which are less far removed from one another.

In a further improvement of the last-mentioned preferred embodiment the lamp is a high pressure metal vapour discharge lamp and the coldest spot in the discharge tube is located — in the operating mode of the lamp — near an end of the discharge tube, and the heat shield is located near that coldest spot of the discharge tube when the lamp is in the non-started cold state.

An advantage of this further improvement is that starting such a high-pressure vapour discharge lamp is now effected much faster and that in the operating mode the lamp is operated within narrower temperature limits.

An end of the bimetal element could for example be clamped onto the discharge tube.

In a further preferred embodiment of a high-pressure metal vapour discharge lamp according to the invention the end of the bimetal element which faces away from the heat shield is connected to a nearby feed-through conductor of the discharge tube.

An advantage of this preferred embodiment is that the fixture of the bimetal element can now be of a better quality.

A heat shield in a lamp according to the invention may, for example, be a flat plate or arcuate shape.

In a preferred embodiment of a high pressure metal vapour discharge lamp according to the invention in which the end of the discharge tube is of a cylindrical shape the heat shield has an elongated arcuate form.

An advantage of this preferred embodiment is that the heat shield can properly envelope the discharge tube near its end over at least half the circumference.

The last-mentioned preferred embodiment may still be further improved in case two similar bimetal elements are present and if the heat shields have also the same shape, while in the non-started cold state of the lamp the two heat shields substantially form a heat-insulating collar around the discharge tube.

An advantage of this last-mentioned improvement is that now in the cold state of the discharge tube a very good heat insulation is available at a tube end, so that the temperature of the coldest spot will rapidly rise when the lamp is started. The result is that the lamp can quickly reach its operating condition.

It is conceivable that the bimetal element is directly connected to the heat shield.

In a further preferred embodiment of a high-pressure metal vapour discharge lamp according to the invention the heat shield is connected to the bimetal element through a lever auxiliary device.

An advantage of this preferred embodiment is that herewith it is, for example, possible to displace the heat shield parallel to the tube axis which enables a very fine control of the heat insulation. Furthermore, in that case it is not necessary to assemble the heat shield from two halves.

In a further preferred embodiment of a high-pressure metal vapour discharge lamp according to the invention the end of the bimetal element which faces away from the heat shield is secured to an adjusting pin of the supporting construction of the discharge tube.

An advantage of this embodiment is that in that case there is, for example, no problem concerning the electric potential of the heat shields. Such a problem can of course arise if electrically conducting bimetal strips and heat shields are fitted to a non-insulated feed-through conductor of the discharge tube.

The heat shield may be of metal. The heat shield may alternatively be constructed from an electrically insulating material.

The invention will be further explained with reference to the accompanying drawings in which.

Figure 1:
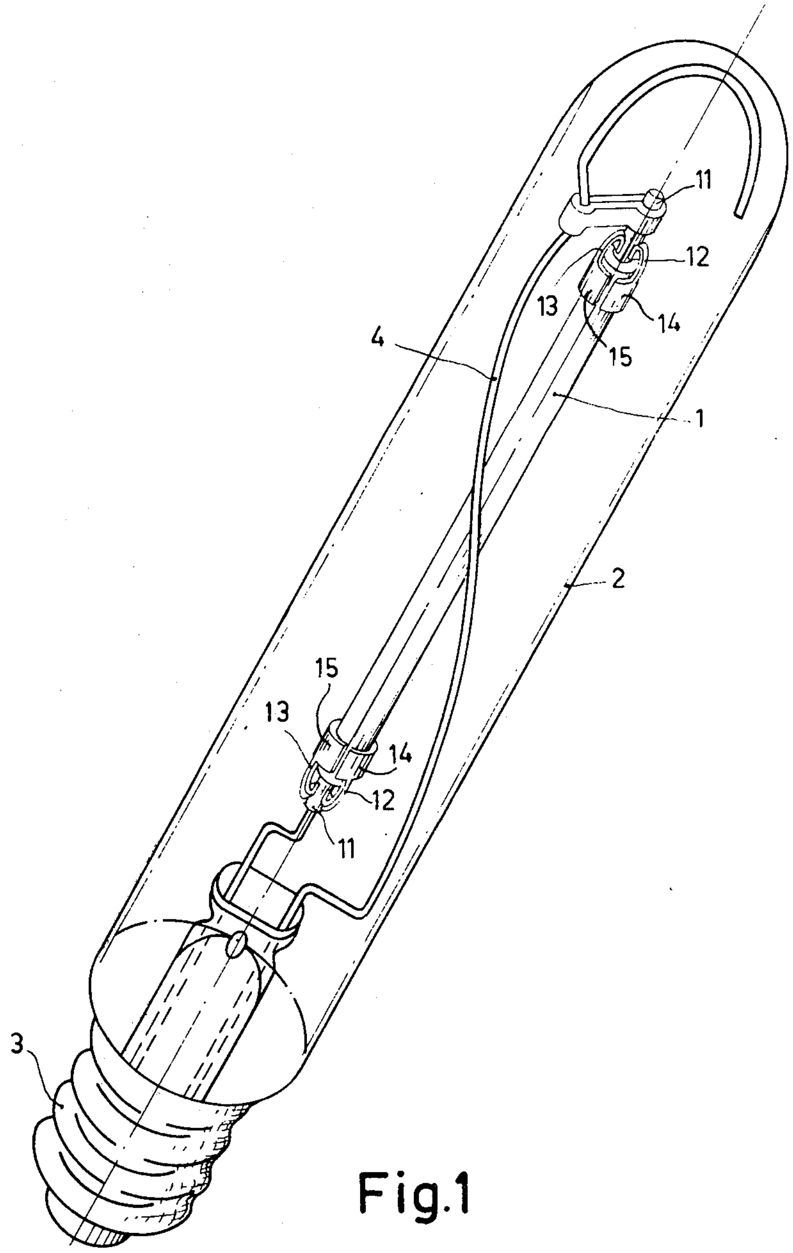
FIG. 1 is a perspective view of a discharge lamp according to the invention.

FIG. 1 shows a high-pressure sodium vapour discharge lamp. A discharge tube 1 is enveloped by an outer bulb 2 with a lamp cap 3 at one axial extremity. A terminal wire 4 extends from the lamp cap 3. The lamp illustrated is a lamp of approximately 400 Watts. Both ends of the discharge tube 1 have been provided with an auxiliary device which is fitted with bimetal strips 12, 13 and heat shields 14, 15. Details are shown in the FIGS. 2 and 3. In the operating mode of the lamp the coldest spot in the discharge tube 1 is near an end of that tube.

Figure 2:
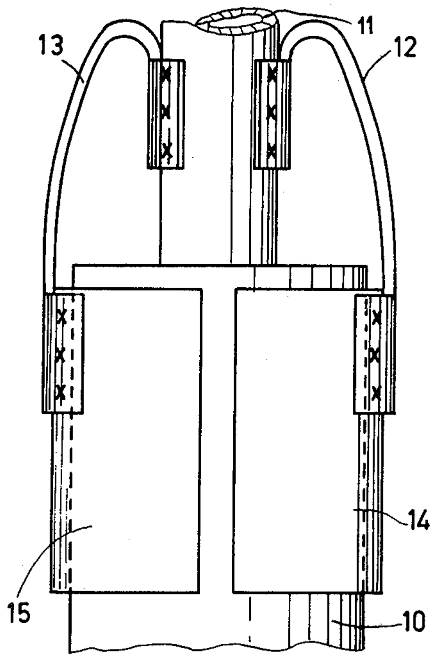
FIG. 2 is an elevational view of the end of the discharge tube of the lamp of FIG. 1 in the cold state of the lamp.

Reference 10 in FIG. 2 designates an end of the discharge tube 1 of FIG. 1. A feed-through bush 11 is electrically conducting and serves to feed current to an electrode, not shown here, in the end 10 of the discharge tube. References 12 and 13 designate bimetal strips which are connected to the feedthrough bush 11. The strip 12 is connected to an elongated arcuate shield 14, made of tantalum. This member serves as heat insulating shield. A similar shield 15 is fitted to the bimetal strip 13. FIG. 2 shows the situation of the lamp when it has not yet been started. Consequently the shields 14 and 15 are clamped around the end 10 of the discharge tube, the heat insulation of this tube end being very high indeed. If now the lamp of FIG. 1 is started, the temperature of the discharge tube and also that of the feed-through bush 11 will rise.

Figure 3:
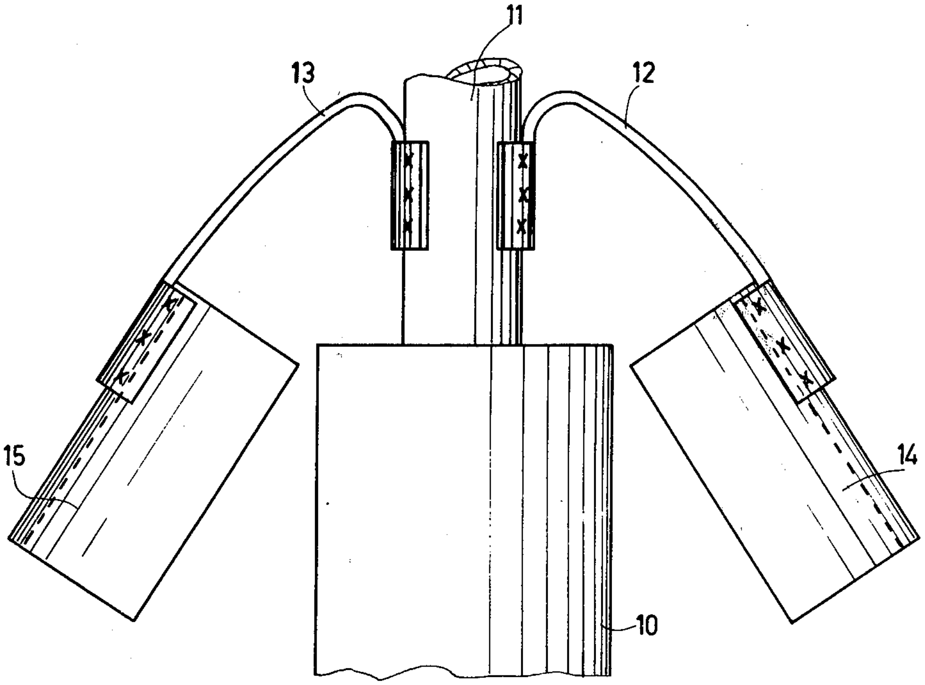
FIG. 3 shows the same end of the discharge tube as shown in FIG. 2, now however in the hot state.

FIG. 3 shows the situation in which the discharge tube 10 has become slightly warmer. The bimetal strips 12 and 13 are straighter so that the heat shields 14 and 15 are further removed from the discharge tube end 10. This means that now the heat insulation of the discharge tube end 10 has decreased. In the hot condition of the discharge tube this insulation need not be so good. With the construction of FIG. 2 and 3 it is achieved that, after starting, the discharge tube is quickly brought to its operating condition. Should the discharge tube end 10 become too cold and consequently also the feed-through bush 11, then the heatshields 14 and 15 will again be moved closer to the discharge tube so that the heat insulation is increased and consequently cooling of the discharge tube end 10 is opposed.

Figure 4:
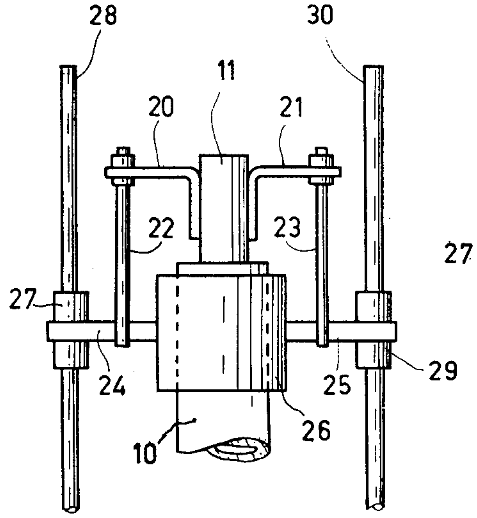
FIG. 4 is a variant of the discharge tube end of the lamp of FIG. 1 in the cold state.
Figure 5:
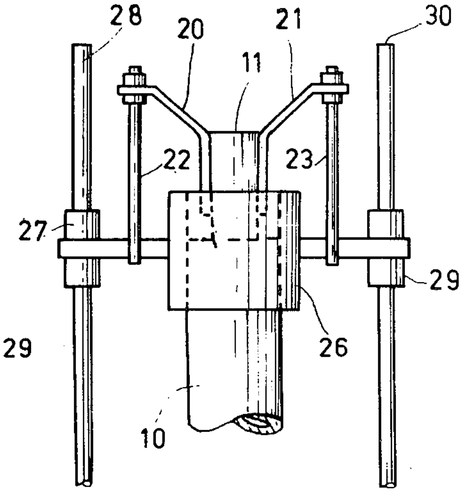
FIG. 5 is the same construction as shown in FIG. 4 however in the hot state.

FIG. 4 shows a variant in which the discharge tube end is again designated by 10 and the feed-through bush by 11. Now, however, the bimetal strips 20 and 21 are connected respectively to levers 22 and 23. These levers 22 and 23 are approximately parallel to the longitudinal axis of the discharge tube end 10. The other end of the lever 22 is connected to a cross bar 24. The other end of the lever 23 is connected to a cross bar 25. The cross bar 24 is connected to a cylindrical heat shield 26. The other end of this cross bar 24 is connected to an electrically insulating guide bush 27. This bush 27 travels along a pin 28. The cross bar 25 is also connected in a similar way to the heat shield 26 and to an electrically insulating guide bush 29. Bush 29 travels along a pin 30. The pins 28 and 30 are also approximately parallel to the longitudinal axis of the discharge tube. One or both pins, 28 and 30 can possibly extend as far as the other end of the discharge tube and contribute to the support of the discharge tube. The same as in FIG. 2, FIG. 4 shows the situation when the lamp is in the cold state. FIG. 5 shows the picture which is obtained when a lamp has been started. The bimetal strips 20 and 21 have straightened so that the heat shield 26 has been lifted and the discharge tube end 10 is covered to a lesser extent. This means that the heat insulation of the discharge tube end 10 has now been reduced. We then have the situation again that the temperature of the discharge tube end 10 is quickly raised and also that, if this end should become too cold or too warm, a regulating influence is obtained by means of the bimetal strips 20 and 21 during the operating condition of the lamp.

Figure 6:
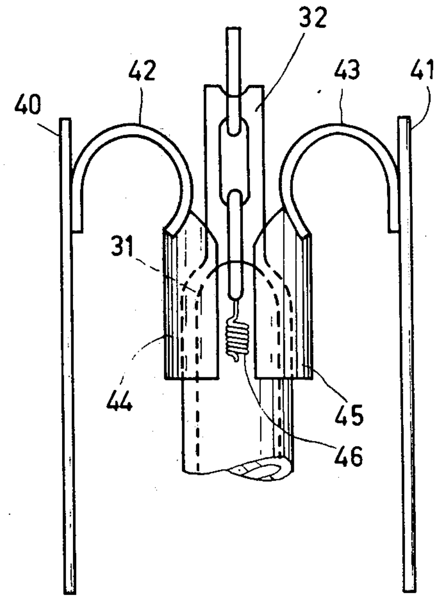
FIG. 6 is a further variant of a discharge tube end of a high pressure mercury vapour discharge lamp according to the invention, namely in the cold state.

FIG. 6 shows a variant in which reference 31 designates an end of a discharge tube, made of quartz, of a high-pressure mercury vapour discharge tube. Reference 32 designates a molybdenum feed-through strip of the tube end 31. In this Figure references 40 and 41 are pins. References 42 and 43 designate bimetal strips. One end of the bimetal strip 42 is connected to the pin 40. One end of the bimetal strip 43 is connected to the pin 41. Heat shields, designated by 44 and 45 respectively, are connected to the other ends of the bimetal strips 42 and 43. Each of the heat shields is elongated and arcuate. Reference 46 is an electrode connected to the feed-through 32. FIG. 6 shows the cold state near this tube end.

Figure 7:
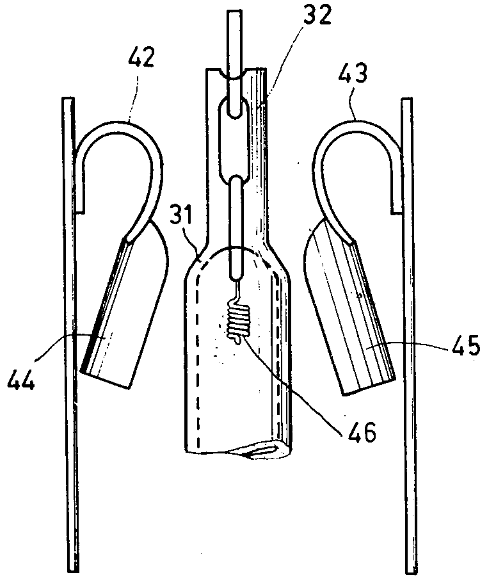
FIG. 7 is the variant of FIG. 6, however in the hot state.

FIG. 7 shows the same construction as of FIG. 6, now however, for the hot state. Here the bimetal strips 42 and 43 have been bent further by the higher temperatures so that the relevant heat shield 44 and 45 are further removed from the discharge tube end 31. Also in this case the same regulating action of the bimetal strips 42 and 43 together with the heat shields 44 and 45 respectively, is found again. This regulating action ensures that the temperature of the coldest spot, which is located in the tube end 31, is kept properly constant.

What is claimed is:

1. A discharge lamp which comprises an elongated discharge tube, first and second electrodes disposed at opposite ends of said discharge tube, a heat shield, and means carrying said heat shield in electrical insulated relation with respect to said first and second electrodes; said means for carrying including a bimetallic element which positions said heat shield in either a first position in proximate relation to said discharge tube substantially at the coldest spot of said tube or a second position in further spaced relation with respect to said discharge tube, said heat shield being normally in said first position following a period in which said lamp is in a steady state off condition and normally in said second position after steady state operation of said lamp.

2. A high-pressure metal vapour discharge lamp as claimed in claim 1 wherein the end of the discharge tube is of a cylindrical shape and that the heat shield is an elongated arcuate member.

3. A high-pressure metal vapour discharge lamp as claimed in claim 2 wherein there are two bimetal elements which extend substantially entirely around said discharge tube in said first position.

* * * * *